May 25, 1937.  F. R. THOMPSON  2,081,413

METHOD OF AND MEANS FOR EFFECTING REMOTE INDICATIONS

Filed March 30, 1933  4 Sheets-Sheet 1

INVENTOR.
Franklin R. Thompson.
BY
ATTORNEYS.

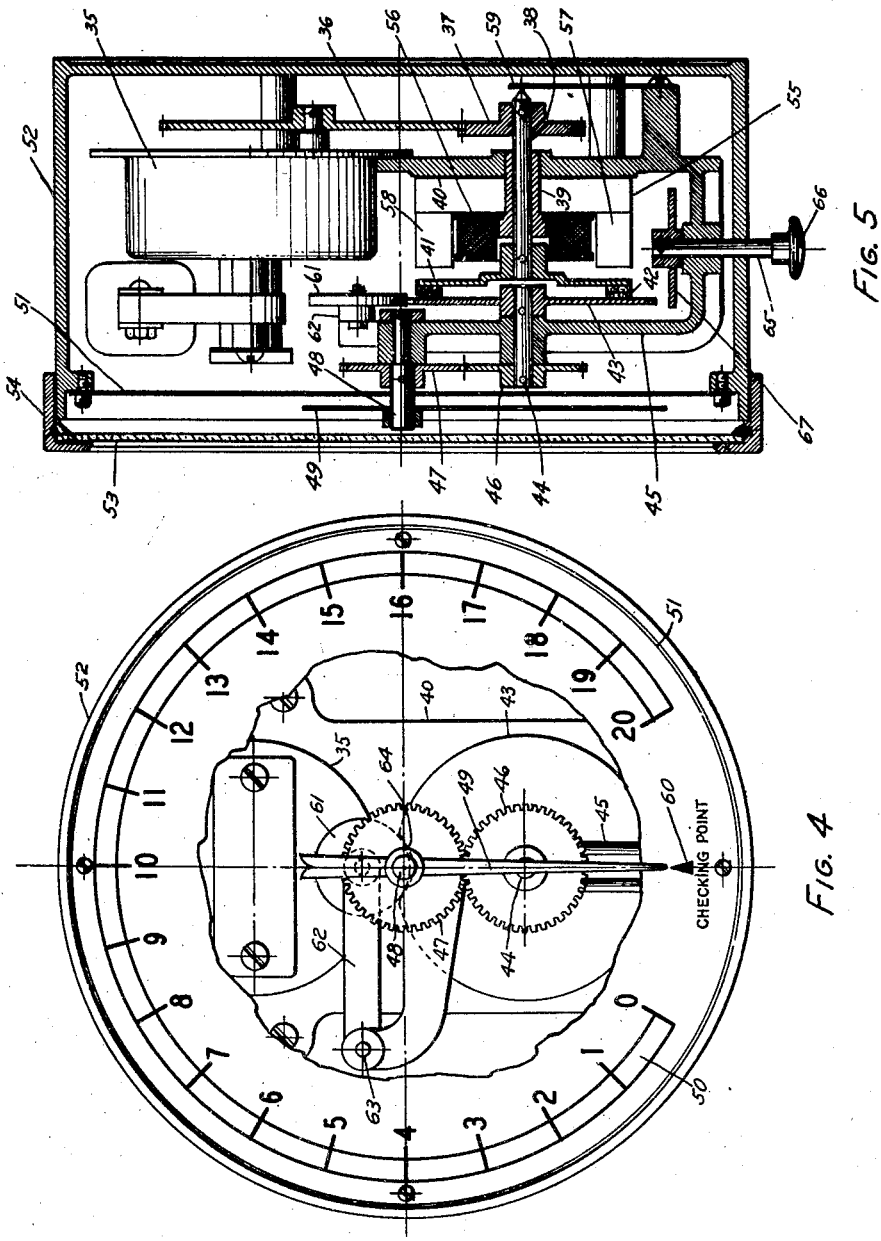

INVENTOR.
Franklin R. Thompson.
BY
ATTORNEYS.

May 25, 1937.   F. R. THOMPSON   2,081,413
METHOD OF AND MEANS FOR EFFECTING REMOTE INDICATIONS
Filed March 30, 1933   4 Sheets-Sheet 4

INVENTOR.
Franklin R. Thompson.
BY
ATTORNEYS.

Patented May 25, 1937

2,081,413

UNITED STATES PATENT OFFICE 2,081,413

METHOD OF AND MEANS FOR EFFECTING REMOTE INDICATIONS

Franklin R. Thompson, Stamford, Conn., assignor to Electric Indicator Corporation, Stamford, Conn., a corporation of Connecticut Application March 30, 1933, Serial No. 663,453

36 Claims. (Cl. 177—351)

This invention relates to a method of and means for effecting remote indications.

It is particularly concerned with an electrical system and its component parts for effecting such indications with great accuracy and at small cost.

In general, my invention comprises a transmitter adapted to operate through repeated cycles, and an indicator also adapted to operate through repeated cycles. These cycles may be, and are preferably, of the same time period, the indicator cycle including, however, a stop or preferably stops, which are effected by the transmitter through impulses transmitted thereby.

The preferred manner of carrying out the present invention consists in sending the pair of impulses from a transmitting station to the receiving station, one at a fixed point in each cycle and one at a point corresponding to the condition transmitted, and causing these impulses to effect momentary interruptions in the travel of an indicator at the receiver.

More specifically, in the preferred embodiment of the present invention the remote indication is effected by causing a member at the transmitting station to travel repeatedly through a given cycle in a given period of time. Similarly, a device at the receiving station is caused to travel through a similar cycle in the same or related period of time. This is effected preferably by constant speed electric motors of any suitable type. The transmitting and receiving stations are connected to each other by means of an electrical circuit which may or may not include a wireless link. The travelling element at the transmitter is caused to operate this circuit to transmit impulses of current to the indicator. In the preferred embodiment of the invention two such impulses are sent for each cycle of operation of the transmitting member. The one impulse is sent at an arbitrary phase of the cycle, as for example, just prior to the beginning thereof. The other impulse is sent at another phase of the cycle, the phase being varied according to the intelligence or indication which it is desired to transmit. The mechanism at the receiving station is arranged to respond to these impulses of current by interruptions of rotation of the indicating element. The one interruption is used for the purpose of bringing the travelling member at the indicator into exact phase with the revolving member at the transmitter. The other interruption is employed to convey to the observer the indication which is being sent from the transmitting station.

The invention will now be described with particular reference to the preferred form of embodiment shown in the accompanying drawings, in which Figure 1 is a front elevation of one form of transmitting instrument embodying the present invention, with the cover plate of the instrument removed;

Figure 4 is a front elevation of the preferred form of receiving instrument of the present invention;

Figure 5 is a longitudinal section of Figure 4;

Similar characters and references indicate similar parts in each of the several views.

Figure 3:
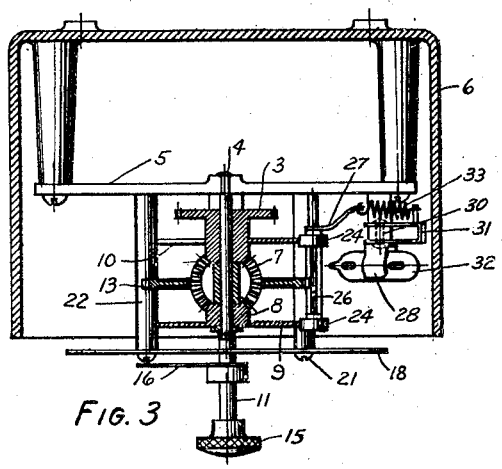
Figure 3 is a transverse section of Figure 1.
Figure 1:
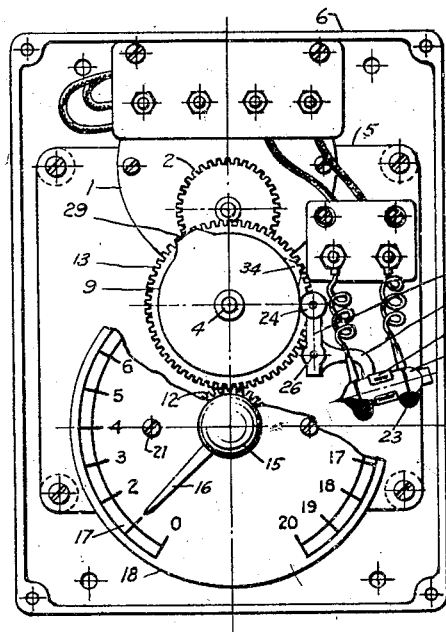
Figure 2:
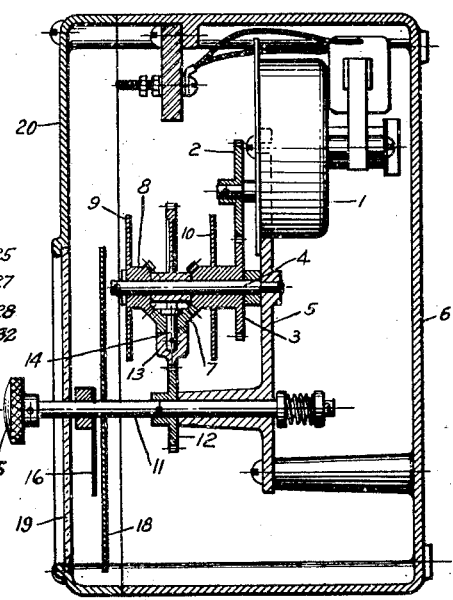
Figure 2 is a longitudinal section of Figure 1.

The transmitting instrument, Figs. 1, 2 and 3, comprises a substantially constant speed motor 1 of any suitable type, but preferably a synchronous motor of the character now commonly employed in electric clocks. This motor rotates a gear 2 which meshes with a gear 3 mounted to be free to rotate on a stud 4 securely fixed, as by riveting, in a base plate 5. This base plate is secured in any suitable manner in the housing 6 of the instrument and serves also as a support for the electric motor 1 and other parts of the mechanism described below. The constant speed rotation of gear 3 is transmitted by means of a miter gear 7 to a gear 8 also mounted to be free to rotate on stud 4. Electric motor 1 thus serves to revolve gears 3 and 8 at like speeds and in the opposite directions on shaft 4.

Disc cams 9 and 10, the purpose of which is to control the operation of an electric switch hereinafter referred to, are affixed to or made integral with gears 3 and 8. These cams are also rotated in opposite directions by the motor at equal and constant speeds.

Provision is made, however, whereby the instantaneous angular positions or phases of cams 9 and 10 with respect to each other may be varied, the mechanism for this purpose consisting in the illustrated embodiment of a shaft 11 on which is mounted a gear 12, which meshes with a ring gear 13 journaled to be free to rotate on shaft 4. The stud 14 which forms the axis of rotation of bevel gear 7 is mounted in gear 13. The adjustment of the angular positions of cams 9 and 10 with reference to each other is effected by rotating shaft 11 in one direction or the other. For example, if for the purpose of illustration we assume motor 1 to be at a standstill and that the operating knob 15 mounted on shaft 11 is rotated clockwise as viewed in Figure 1, this rotation of shaft 11 causes counter-clockw'se rotation of gear 13 and consequently counter-clockwise movement of cam 9 with reference to cam 10, the latter cam being held stationary by reason of the assumed standstill of motor 1.

A pointer 16 is fixed on shaft 11, so as to cooperate with a scale provided on a disc 18 fixedly mounted within the casing of the instrument in any suitable manner, as by screws 21 cooperating with lugs 22, fixed on base plate 5. A window 19 is provided in the cover 20 of the casing so that the pointer and scale may conveniently be viewed therethrough.

A switch 23 preferably of the mercury contact type is provided to be operated by cams 9 and 10, the mechanism for effecting this operation being comprised of cam rollers 24 mounted on arms 25 in position to cooperate with cams 9 and 10. Arms 25 are pivoted on a fixed pin 26 and serve to rock an arm 27, which operates mercury switch 23. This switch for this purpose is arranged to pivot about a fixed pin 30, a U-shaped bracket 31 being provided with clamps 28 embracing the bulb 32 of the switch. A spring 33 is arranged operatively to connect bracket 31 with arm 27, the arrangement being such that when bell crank arm 27 is rocked in clockwise direction in Figure 1, switch 23 is caused to assume its closed position by the snap action of spring 33. Similarly, when bell crank arm 27 is rotated counter-clockwise to the position indicated in the drawings, switch 23 is returned by the snap action of spring 33 to the non-contacting position indicated in Figure 1.

It will be understood, of course, that the switch closing and opening movements of bell crank arm 27 are effected by means of cams 9 and 10, a projection 29 being provided for this purpose on cam 9 and a projection 34, indicated in dotted lines in Figure 1, being similarly provided on cam 10.

From the foregoing description of the apparatus of Figures 1, 2 and 3, it will be apparent that when motor 1 rotates, cams 9 and 10 will be revolved at constant speed and in the opposite direction about shaft 4 and that the circuit which passes through switch 23 will normally be open, being closed only at two instances during the revolution of the cams, the one instance being when the projection 34 of cam 10 operates the switch and the other instance being when the projection 29 of cam 9 operates the switch. It will be noted, moreover, that by reason of the shape of projections 34 and 29 of the cams, the interval of time during which switch 23 will be held closed will be shorter when the operation is being effected by cam 10 with projection 34. The circuit which passes through switch 23 is thus caused for each rotation of cams 9 and 10 to send one impulse of current of short duration and another impulse of current of longer duration. It will be understood that the time interval between the short impulse and the longer one will differ with the angular position of shaft 11. In the preferred embodiment the short impulse continues for approximately two seconds and the long impulse for approximately four seconds.

In the preferred embodiment the parts are so constructed and arranged that when the pointer 16 is at the zero point of scale 17, this time interval is a pre-determined minimum. As pointer 16 is moved over scale 17 this time interval is correspondingly increased. The length of the time interval between impulses is thus an accurate criterion of the position of the pointer with reference to its scale.

The electric impulses thus originated at the transmitter are sent to a receiving instrument by electrical circuits described hereinafter. The manner in which these impulses are caused to operate an indicator at the receiver will now be described, particular reference being had to Figures 4 and 5.

An electric motor 35, which may be similar to the motor 1 of Figure 1, is provided to rotate a gear 36 at constant speed. This gear meshes with gear 37 pinned to a shaft 38 free to rotate in a bearing 39 fixed in the base plate 40 of the instrument. Shaft 38 serves to rotate the clutch disc 41 of a friction clutch 42, disc 41 being pinned to shaft 38 as shown. The driven element of clutch 42 comprises a disc 43, fixed to a shaft 44, journaled in the member 45 of the frame of the instrument, this member being integral with the assembly base plate 40. Shaft 44 drives a gear 46 mounted thereon, which gear transmits its rotation to a gear 47, mounted on shaft 48, journaled also in the member 45 of the frame of the instrument. A pointer 49 is mounted to rotate with shaft 48 and to cooperate with a scale 50, provided on a disc 51, secured to suitable lugs provided in the casing 52 of the instrument. A window 53 is provided in the cover 54 of the instrument to render the pointer and scale visible therethrough.

The mechanism, as thus far described, serves to transmit the constant speed rotation of the motor 35 of the instrument to the pointer 49.

This constant speed rotation of the pointer may, however, be interrupted by means of a mechanism comprising an electro-magnet 55. The coil 56 of this electro-magnet is provided to cooperate with pole pieces 57 and 58 in such manner that the circuit of the magnetic flux is completed through the clutch element 41, this element being of soft iron in distinction from the clutch element 43 which is made of copper or other non-magnetic material. By reason of this arrangement, an energization of magnet 55 will cause the clutch element 41 to be attracted toward the pole pieces against the pressure of spring 59 so that the clutch 42 will become disengaged. The rotation of pointer 49 will thus be interrupted for the duration of the energization of electro-magnet 55. Depending upon the duration of the impulse passing through the electro-magnet, the pointer will stand still for a corresponding period of time and then resume its travel. By noting the readings on the scale at which the pointer movement is interrupted an observer will be able to ascertain the time interval between the impulses from the transmitting station.

In the preferred embodiment of the invention the parts are so adjusted that when the short impulse comes from the transmitting station, the pointer will be accurately set to register with a checking point indicated at 60 in Figure 4. The pointer is automatically reset at this checking point once during each rotation, this being accomplished by the provision of a weighted roller 61, mounted in an arm 62, free to swing about a pivot 63 provided in the frame of the instrument. Roller 61 rides on the rim of the disc 43 of clutch 42. The circumference of this disc is provided with a recess 64, which is so located in the said rim that when the roller 61 is in the center of the recess the pointer 49 will register exactly with checking point 60, as shown in Figure 4. At each short impulse of current flowing through electro-magnet 55, cam roller 61 will thus accurately set pointer 49 at the checking point, so that at the moment of cessation of the impulse from the transmitting station rotation of pointer 49 will commence from the fixed checking point. Even though pointer 49 may thus at times complete one cycle of rotation slightly faster or slower than other times, it will start each new cycle from the same starting point, irrespective of any inaccuracy that may have prevailed during the preceding cycle of rotation. The inaccuracies of one rotation are thus prevented from being carried over into the next rotation.

This resetting of the pointer at the checking point for every revolution depends upon roller 61 being somewhere within recess 64 at the time electro-magnet 55 is energized. If the inaccuracy is greater than the length of recess 64, the resetting of the pointer to the checking point must be accomplished manually. For this purpose there is provided a shaft 65, having an operating knob 66 projecting from the lower face of the instrument, as shown in Figure 5. The upper end of shaft 65 is provided with a disc 67, which is adapted to be pressed into frictional contact with the edge of disc 43, so that that disc may thus be turned in one direction or the other, until the roller 61 is somewhere in recess 64 at the time of the commencement of the short impulse through electro-magnet 55. Roller 61 will then be enabled automatically to accomplish its resetting function.

As hereinbefore noted, the travel of pointer 49 commences with the cessation of the short impulse and continues to the beginning of the long impulse. The reading of the scale at which the pointer ceases its rotation will be a function of the time interval which has elapsed between these impulses. By proper calibration this scale may be made direct reading, as will be readily understood by those versed in the art. The durations of the impulses may be made of any convenient value, and in practice it has been found that a short impulse of two seconds and a long impulse of four seconds may conveniently be used, as hereinbefore noted.

Naturally, the synchronization accomplished by the weighted roller 61, and arranged also for accomplishment by the hand member 66 is merely to overcome errors created by variations in the frequency of the electrical supply of the transmitting and receiving motor devices. Should there be no such errors in frequency, or, should both the transmitting and the receiving devices be supplied by the same source of electrical energy, there will always be perfect synchronization. This is provided for by calibrating the speed of the indicating hand 49 so that the time it is moving during a particular cycle added to the time that it remains still during the cycle is equal to the time duration of a cycle of the transmitting device. Thus, in the claims appended hereto, I will claim the time duration of the closed cycles of the indicating and transmitting devices as equal.

Figure 6:
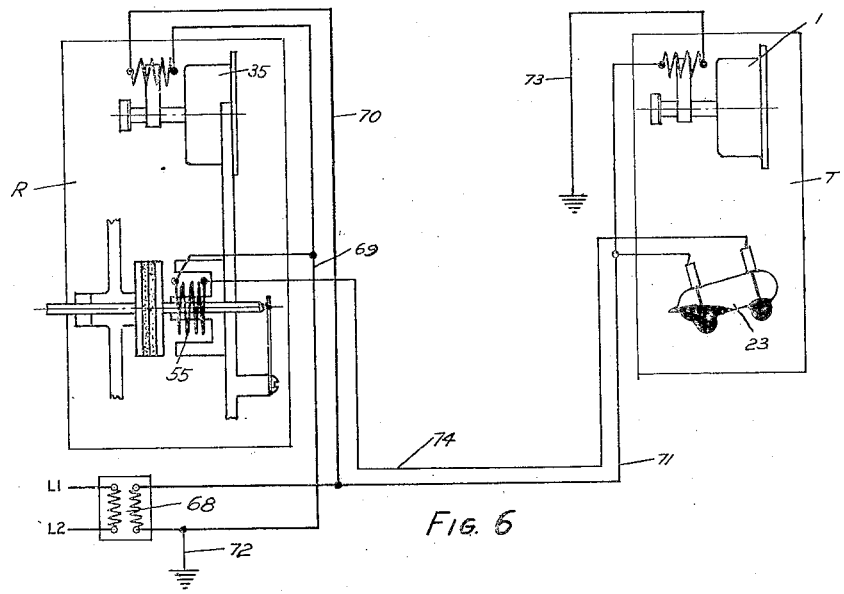
Figures 6, 7, 8 and 9 are diagrams showing various forms of circuits for operatively associating the transmitting and receiving devices of the present invention.

The circuit connections that may be employed between the transmitting and receiving instrument are diagrammatically indicated in Figures 6, 7, 8 and 9. In Figure 6 the transmitting instrument is indicated generally by the reference character T and the receiving or indicating instrument by the reference character R. In the arrangement of Figure 6 electric current for operating the instruments at R and T is obtained from a source of power indicated by L1 and L2, which through a transformer 68 located at the receiving instrument, furnishes operating current to the motor 35 of the receiving instrument through local conductors 69 and 70. Transformer 68 furnishes operating power also to the motor 1 of the distant transmitting instrument by means of a conductor 71, ground connections 72 and 73 being used for the return conductor. The circuit for electro-magnet 55 at the receiving instrument is connected to the switch 23 of the transmitting instrument by means of a conductor 74. The conductor 71, which as hereinbefore stated, is used to furnish operating current to the motor at the transmitting station is employed also to complete the circuit of the electro-magnet, the circuit for the electro-magnet 55 being from transformer 68, through conductor 69, through coil 56, line 74, switch 23 and line 71, back to transformer 68.

Figure 7:
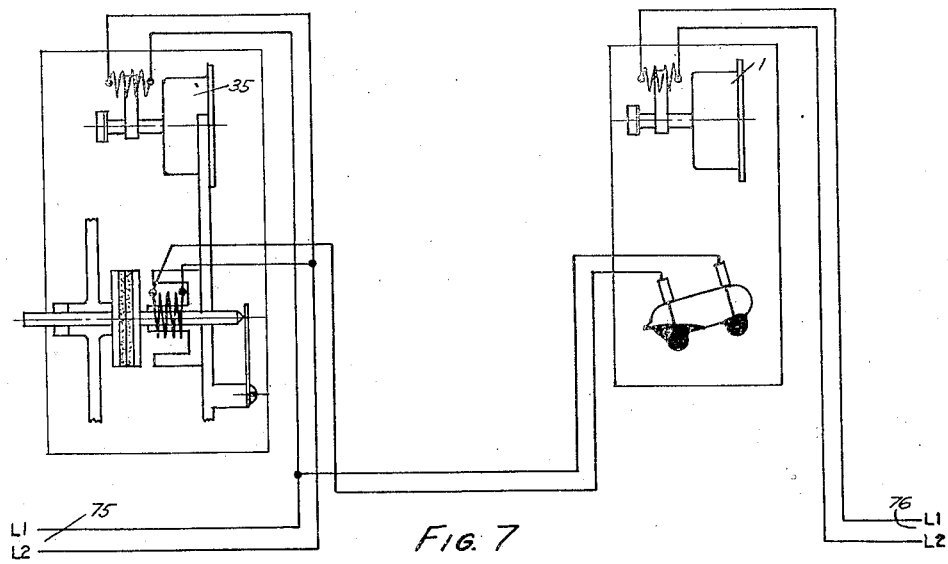

The circuit diagram of Figure 7 is similar to that of Figure 6 with the exception, however, that both the receiving and transmitting stations are located conveniently with reference to local sources of power 75 and 76. In such instances it is unnecessary to connect motors 35 and 1 to the same source, as in Figure 6. These motors are in such case directly connected to their respective adjacent sources 75 and 76, as shown in Figure 7.

Figure 8:
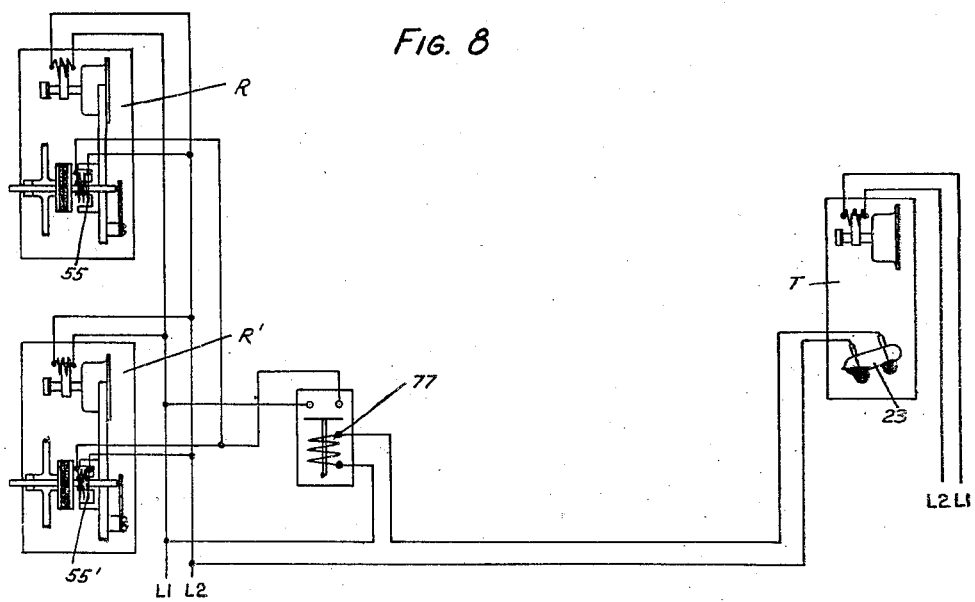

Figure 8 shows a diagram in which a single transmitting station T is connected with a plurality of receiving stations R and R'. In this arrangement the switch 23 controls the operation of a relay 77, the contact of which controls the circuits of electro-magnet 55 of receiver R and electro-magnet 55' of receiver R'. In the arrangement of Fig. 8, these circuits are connected in parallel to each other through said contact on relay 77.

Figure 9:
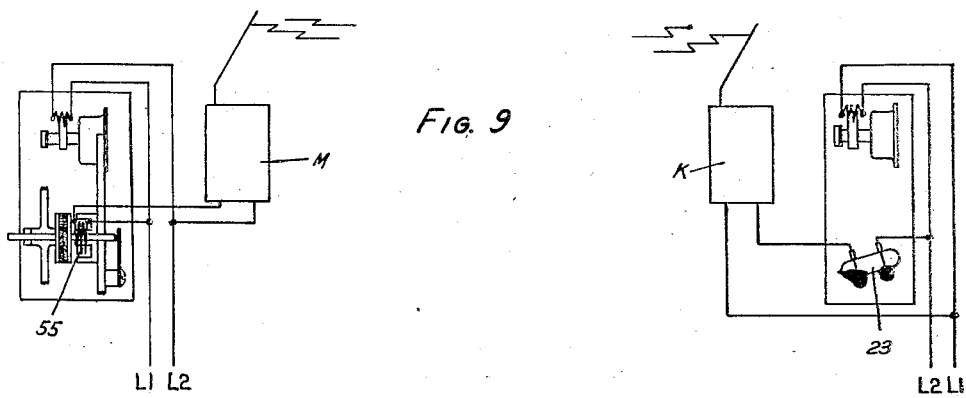

In the circuit arrangement of Figure 9 switch 23 operates a radio impulse transmitter indicated by K, causing this transmitter to transmit the short and long impulses to a radio impulse receiver M, located at the receiving station, this receiver being operated to close or open the circuit of electro-magnet 55, depending upon the closed or open position of switch 23.

The manner of operation of the system of my invention will now be readily understood. The transmitting and receiving apparatus are associated with each other and with sources of current in the manner shown in the diagrams of Figures 6 to 9, inclusive. This causes the motors 1 and 35 of the transmitting and receiving apparatus to rotate at constant speeds. These speeds need not, of course, be the same since it will be recalled that the indicator will actually move through a cycle, including stops equalling six seconds, while the transmitter moves continuously and without stops through a cycle of equal time duration. If the movements of the transmitter and indicator are equal, as in this case a full revolution of 360 degrees, it follows naturally that the indicator must move faster than the transmitter, and that this difference in movement may be obtained through the use of motors of different speeds, or through proper gear reduction. It also causes the operation of switch 23 at the transmitter, so that for each rotation of the cam discs 9 and 10 at the transmitter, two impulses of current are caused to flow through the electro-magnet 55 of the receiver, the two impulses being distinguishable from each other at the receiver or indicator by their duration.

The gear trains of the transmitter and receiver are so proportioned that cam disc 10 makes a complete revolution for each completed revolution of pointer 49. By proper adjustment the short impulse of current is caused to flow through the system at the instant when pointer 49 passes the checking point. As a consequence of this, pointer 49 commences each revolution at the end of the short impulse of cam disc 10 and in exact phase with the corresponding cycle of the transmitter. Pointer 49 continues its revolution until it is interrupted by the longer impulse of current. This longer impulse of current depends, it will be recalled upon the setting of pointer 16 at the indicator. Pointer 49 will remain stationary at its interrupted position for the duration of the longer impulse so that the attendant may read its position. The scale at the indicator is calibrated to correspond with the scale at the transmitter and the position of pointer 16 at the transmitter may thus be accurately read by reading the position of pointer 49 with reference to its scale at the indicator. After the cessation of the longer impulse, pointer 49 resumes its travel and continues to rotate until it again arrives at the checking point, at which instant the transmitter will send out the short impulse and hold the pointer for a short interval of time at the checking point. As hereinbefore noted, any slight inaccuracy that may have arisen during the preceding cycle of operation due to variations in the current supply is automatically eliminated by the resetting device comprising roller 61, so that with the beginning of the new cycle exact synchronism is restored.

Figure 10:
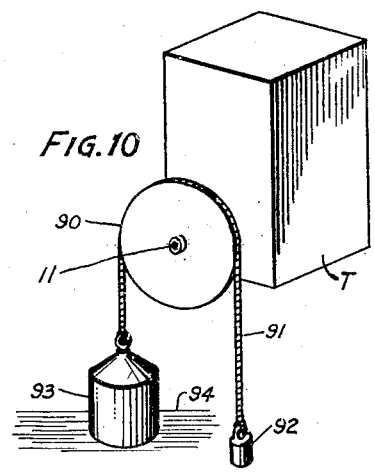
Figure 10 is a diagrammatic perspective view showing one form of application of the system of the present invention.

The system of my invention is capable of a great many practical applications, one of which is illustrated in Fig. 10 in which the transmitter T of Fig. 1 is shown as provided with a sprocket wheel 90 mounted on shaft 11 instead of the manually operable knob 15 of Fig. 2. A chain 91 passes over sprocket wheel 90 and is provided at one end with a counter weight 92 and at the other end with a float 93. As the level of the liquid 94 in which float 93 is immersed rises or falls, sprocket wheel 90 is turned in one direction or the other. This causes shaft 11 to turn in a corresponding manner, changing the position of pointer 16 and thus varying the time intervals between the long and short impulses from the transmitter. This causes the pointer 49 of the indicator to stop at positions on its scale corresponding to the positions of pointer 16 at the transmitter. By proper calibrations of the scale it will thus be possible to read directly at the remote point the level of the liquid 94.

Although reference is had in the present description to the indication of liquid levels, it will be understood that the invention is capable of a great many other uses, as, for example, for indicating pressures, temperatures, rates of flow of liquids and gases and any other element, device or primary movement that may be geared or otherwise applied to rotate shaft 11. In each such instance, it is necessary merely to provide apparatus for causing the shaft of pointer 16 at the transmitter to assume positions depending upon the indication it is desired to transmit and to calibrate the scale at the indicating instrument accordingly.

It will be understood that by reason of the nature of the impulses which are used for transmission from one instrument to the other, lines that are commonly available for the transmission of telephonic and telegraphic currents are capable of utilization without interfering with the normal operation of these lines.

It may be helpful to the further understanding of the invention and in the reading of the claims relatively to the particular structure, if I emphasize once again that by the time interval of a cycle of the transmitter, I mean the time interval or period beginning at the end of one short impulse of the transmitter and ending at the end of the next short impulse. The time interval or period of the indicating cycle begins with the movement of the indicator from its checking point at the end of one short impulse and ends at the start of its movement at the end of the next short impulse. The travel of the indicator during a cycle includes movement from the checking point to its indicating point, a four-second halt at its indicating point and then movement to the checking point with a further halt of two seconds. The actual travel of the indicator and transmitter need be of very little importance in the operation of my system. Rather, it is the relation of the cycles of the transmitter and indicating device in conjunction with the stopping periods, which is of extreme importance and which when properly arranged contributes the results herein set forth.

I intend to claim my invention is an broad terms as possible, especially with regard to the cycle operation of my transmitter and indicator. Lack of the proper descriptive words makes it difficult to define the cycle operation, and unless relatively broad terminology is used, the claims may conceivably be limited to a greater extent than is necessary. It may be indicated, however, that by the expression "cycles of impulses" which I employ in some of my claims, I mean the sending, preferably in predetermined order, of a series of impulses with the number and order of the impulses repeated in each cycle. Thus, "cycles of impulses" may mean cycles during each of which two identified impulses are sent, the distance between the impulses in either time or actual physical distance, denoting the quantity of a variable quantity to be measured. The words "drive", "operate" and "move" are all to be considered substantially equivalent when used in conjunction with the words "during a cycle". The purpose of using these words is to broaden the aspect of the claims. As for the expression, "drive through a cycle", it may mean a cycle of time, a cycle of a series of operations, or a cycle of impulses. Just what it may mean in a particular claim depends on the phrasing of the remainder of the claim. In order to have a better appreciation of the claims, it should also be indicated that the word "interrupt" as used with travel or movement of the indicator, means a stopping or a halting of the movement of the indicator in its ordinary direction of travel, and does not mean a mere momentary deflection of the indicator, as in the Roucka Patent No. 1,597,828.

I claim:

1. The method herein described, which consists in transmitting from a transmitting station to a receiving station repeated cycles of impulses in which each cycle has at least one impulse and with said impulse spaced from any arbitrarily selected point in said cycle which may be selected as the beginning of the cycle, dependent on the then quantity of a variable quantity to be transmitted, moving an indicator at a predetermined speed at the receiving station and with reference to some point in predetermined relation to the transmitting cycles, and momentarily halting the travel of said indicator in each transmitting cycle in response to the impulse received from the transmitting station.

2. The method herein described, which consists in moving a member at the transmitting station at predetermined speed with reference to a point of origin, moving a second member at the receiving station also at predetermined related speed to said first member and with reference to a point of origin in predetermined relation to said first point of origin, and interrupting momentarily the travel of said member at the indicating station when said member at the transmitting station reaches a point determined with reference to its point of origin in accordance with the variation in quantity of a variable quantity to be measured.

3. The method herein described which consists in moving a transmitting member at a transmitting station during repeated cycles of predetermined periods of time, moving an indicating member at a receiving station through predetermined distances with reference to a selected reference point during repeated cycles of like periods of time, signalling to the receiving station during each cycle the position of the transmitting member at a point in its cycle determined from a reference point, to which said first reference point is related, in dependence on the quantity of a variable quantity to be measured, and halting the indicating member momentarily in its cycle in response to said signalling.

4. The method herein described which consists in moving a transmitting member at a transmitting station during repeated cycles of predetermined periods of time, moving an indicating member at the receiving station through a predetermined path and relatively to a reference point in each of repeated cycles of predetermined periods of time, signalling to the receiving station during each transmitting cycle the position of the transmitting member at a point in said cycle determined from a reference point, to which said first reference point is related, dependent on the quantity of a variable quantity to be measured by halting the indicating member temporarily at a corresponding position in its cycle, and setting the speed of movement of said members, and the time duration of said halt of the indicating member so that the period of the cycle of the transmitting member is equal to the time period of the cycle of the indicating member including its halt.

5. The method herein described which consists in moving a transmitting member at the transmitting station through repeated cycles in predetermined periods of time, moving an indicating member at the receiving station through a predetermined path during each of repeated cycles of predetermined duration of time as compared to the time period of the transmitter cycles, signalling to the receiving station during each transmitting cycle the position of the transmitting member at a given point in said cycle determined from a reference point depending on the then quantity of a variable quantity to be measured by halting the indicating member temporarily at a corresponding position from a reference point in its cycle, and setting the cycles of the indicating member so that they include the halting period.

6. The method herein described which consists in moving a transmitting member at the transmitting station through repeated cycles in predetermined periods of time, moving an indicating member at the receiving station through a predetermined path during each of repeated cycles of like periods of time, signalling to the receiving station during each transmitting cycle the position of the transmitting member at a given point in each cycle determined from a reference point depending on the then quantity of a variable quantity to be measured by halting the indicating member temporarily at a corresponding position from a reference point in its cycle, and setting the cycles of the indicating member so that they include the halting period.

7. The method herein described which consists in moving a transmitting member at a transmitting station during repeated cycles of predetermined periods of time, signalling to a receiving station the position of the transmitting member at a point in each cycle spaced from the beginning of said cycle in accordance with the quantity of a variable quantity to be measured, moving an indicating member at the receiving station during repeated cycles at predetermined speed relatively to a predetermined point, and stopping said indicator momentarily for a period when the receiving station receives each of said transmitted signals.

8. The method herein described which consists in repeatedly moving a transmitting member through a predetermined path cycle in a predetermined period of time, sending forth an impulse at a point in each path cycle spaced from the beginning of said path cycle corresponding to the then magnitude of a variable quantity to be measured, repeatedly moving an indicator through a predetermined path cycle in the same time period as said transmitting member, halting said indicator for a predetermined period in its movements in response to each of said impulses, and setting the speed of movement of said indicator so that the time period of its path cycle including said halt is the same as the time period of the transmitting member path cycle and so that it begins each path cycle at the same time the indicating member begins each path cycle.

9. The method herein described, which consists in transmitting from a transmitting to a receiving station repeated cycles of impulses in which each cycle has a plurality of impulses spaced therein in accordance with the quantity of a variable quantity to be measured, moving an indicating member at a predetermined speed at the receiving station, and momentarily halting the continuous travel of the indicating member in response to the impulses received from the transmitting station.

10. The method herein described which consists in moving a transmitting member at the transmitting station during repeated cycles, moving an indicating member at the receiving station during repeated cycles, signalling to the receiving station during each transmitting cycle the positions of the transmitting member at a plurality of points in said cycle spaced dependent on the quantity of a variable quantity to be measured by temporarily halting the indicating member at corresponding points in its cycle, and setting the speed of the travel of said members and the time duration of said stops so that the time period of the cycle of the transmitting member is equal to the time period of the cycle of the indicating member.

11. The method herein described which consists in moving a transmitting member at the transmitting station during repeated cycles of predetermined periods of time, moving an indicating member at the receiving station through a predetermined path during each of cycles of like periods of time, signalling to the receiving station during each cycle the positions of the transmitting member at a plurality of points in said cycle spaced in accordance with the quantity of a variable quantity to be measured by temporarily halting the indicating member for a given period of time at one point in said cycle in response to one signal and temporarily halting the indicating member for a period of time at another point in said cycle in response to another signal, and setting the speed of said members and the duration of said stops so that the period of a cycle of the transmitting member is equal to the period of a cycle of the indicating member.

12. The method herein described which consists in sending from a transmitting to a receiving station a plurality of impulses spaced in time in accordance with the quantity of a variable quantity to be measured and differing from each other in duration, moving an indicating member at predetermined speed at the receiving station, halting the travel of the indicating member in response to the impulses received from the transmitting station, and setting such halts so that they will be of a duration corresponding to the durations of the impulses.

13. The method of transmitting the position of a measurement indicator to a receiving station which comprises moving a pair of signalling elements through cycles of like periods of time, each sending out a signal once during each cycle in response to particular positioning of each of said signalling elements, changing the positioning of said elements relatively to one another in accordance with the position of the measurement indicator so as to vary the time between the signalling of said elements during a cycle in proportion to the measurement indicated by said indicator, moving an indicating member at the receiving station at a speed proportional to the speed of said signalling devices, and halting said indicating member for a predetermined period each time a signal is received whereby the distance moved by said indicating member between the stops induced by said impulses is proportional to the measurement indicator position.

14. The method of transmitting the position of a measurement indicator to a receiving station which comprises moving a pair of signalling elements through cycles of like periods of time, each sending out a signal once during each cycle in response to particular positioning of said elements, changing the positioning of said elements relatively to one another in accordance with the position of the measurement indicator so as to vary the time between the signalling of said elements during a cycle in proportion to the measurement indicated by said indicator, moving an indicating member at the receiving station at a speed proportional to the speed of said signalling devices and halting said indicating member for a predetermined period each time a signal is received, and setting the time consumed by said indicating member in one cycle while moving and while halting for said predetermined periods to equal the time of the cycle of the signalling elements.

15. The method of transmitting the position of a measurement indicator to a receiving station which comprises moving a pair of signalling elements through cycles of like periods of time, each sending out a signal once during each cycle in response to particular positioning of said elements, changing the positioning of said elements relatively to one another in accordance with the position of the measurement indicator so as to change the elapsed time between the signalling of said elements during a cycle in proportion to the measurement indicated by said indicator, repeatedly moving an indicating member at the receiving station through a predetermined path in a period equal to that of the signalling elements, halting said indicating member momentarily upon the receipt of one of said signals denoting the beginning of a cycle, and then halting the indicator momentarily upon receiving the second signal, and setting the time consumed by said indicator while moving and while stopped along said path to equal the time of the cycle of the signalling elements.

16. In combination, a transmitter including a transmitting means, means for repeatedly moving said means through a path cycle in a predetermined period of time, a receiver including an indicating member, means for repeatedly moving said member through a path cycle in a like period of time, said last named means comprising a motor and an electromagnetically controlled clutch between said motor and said indicating member, an electric circuit for said electromagnet adapted to control said electromagnet to halt the movement of said indicating member, means for governing said circuit by said transmitting means to so halt said indicating member and comprising mechanism for closing said circuit for a predetermined period at one point in the path cycle of operation of the transmitter denoting the beginning of the cycle and for another period in another point in the path cycle spaced from said first point in accordance with the quantity of a variable quantity to be measured, said period of the path cycle of the indicating member including said halts.

17. In combination, a transmitter having a transmitting means, means for moving said means during repeated cycles of predetermined intervals, means responsive to the quantity of a variable quantity to be measured and transmitted, cooperable with said transmitting means to send forth an impulse in each cycle at a point in the time interval of said cycle spaced from an arbitrarily selected reference point in said cycle dependent on the then magnitude of the quantity to be measured, a receiving instrument having an indicating means, means for moving said indicating means during repeated cycles of intervals of time equal to the duration of the transmitting cycles and relatively to a reference point related to the reference point of the cycles of said transmitting means, and means for momentarily halting said indicator in each cycle in response to said transmitted impulse, each of said indicating cycles including said momentary halting period of said indicator.

18. In combination, a transmitter including a transmitting member, means for moving said transmitting member relatively to a reference point, during repeated cycles of predetermined time intervals, a receiver including an indicating device, means for moving said indicating device relatively to a reference point related to said first reference point, during repeated cycles each of predetermined duration relatively to said transmitting device cycles, each of said indicating device cycles including a period of movement from a checking point to an indicating point and movement from said indicating point to a checking point once again, means whereby said transmitting member sends forth an impulse at a point in the time interval of each cycle dependent on the then quantity of a variable quantity to be measured, and means for momentarily halting said indicator at said indicating point operable in response to said impulse, each of said indicating cycles including said halting period.

19. In combination, a transmitter including a transmitting member, means for operating said transmitting member through repeated cycles of predetermined time intervals, a receiver including an indicating device, means for moving said indicating device through repeated cycles of operation of the same time duration as said transmitting device cycles, each of said indicating device cycles including a period of movement from a checking point to an indicating point, a momentary halt at said indicating point, and movement from said indicating point to a checking point once again, means whereby said transmitting member sends forth an impulse at a point in the time period of each of its cycles spaced from corresponding arbitrarily selected checking points in said transmitter cycles dependent on the quantity of a variable quantity to be measured, and means for momentarily halting said indicator at its indicating point operable in response to said impulse, each of said indicating cycles including said halting period.

20. In combination, a transmitter including a transmitting member, means for operating said transmitting member through repeated cycles of predetermined intervals, means whereby said transmitting member sends forth an impulse at a point selected relatively to a reference point in the time period of each cycle dependent on the then quantity of a variable quantity to be measured or transmitted, a receiver including an indicating device, means for operating said receiving indicating device through fixed cycles of predetermined duration relatively to said transmitter cycles and relatively to a reference point related to said first reference point, and means for halting said indicating device momentarily in each of its cycles in response to the said impulse, the said indicating cycles including the period of said momentary halting.

21. In combination, a transmitter having transmitting means, means for driving said means through repeated cycles of predetermined periods of time, means responsive to the quantity of a variable quantity to be measured cooperable with said transmitting means to send forth an impulse in each cycle at a point in each cycle determined relatively to a reference point in accordance with the then quantity of said variable quantity, a receiver having an indicating device, means for moving said indicating device at predetermined speed through repeated cycles and with reference to some point in predetermined relation to the reference point of the transmitting cycles, said cycles being of predetermined duration relatively to said transmitting cycles, means for halting momentarily in each cycle the movement of said indicator in response to the impulse received from the transmitter, each of said indicating cycles including said momentary halt.

22. In combination, a transmitter having a transmitting means, means for driving said means through repeated cycles of predetermined periods of time, means responsive to the quantity of a variable quantity to be measured cooperable with said transmitting means in each cycle to send forth an impulse in each cycle at a point in each cycle determined relatively to a reference point in accordance with the then quantity of said variable quantity, a receiver having an indicating device, means for moving said indicating device at predetermined speed through repeated cycles of the same time duration as said transmitting cycles and with reference to some point in predetermined relation to the reference point of the transmitting cycles, means for halting momentarily in each cycle the movement of said indicator in response to the impulse received from the transmitter, each of said indicating cycles including said momentary halt.

23. In combination, a transmitter having transmitting means, means for driving said means through repeated cycles of predetermined time, each cycle having corresponding reference points, means responsive to the quantity of a variable quantity to be measured, cooperable with said transmitting means to send forth an impulse in each cycle spaced from said reference point in accordance with the then quantity of said variable quantity, a receiver having an indicating device, means for moving said indicating device at a predetermined speed and operable through repeated cycles, each cycle having a corresponding reference point, through which said indicating device moves, and each cycle being of predetermined duration relatively to said transmitting cycles, means, when operable, for momentarily halting the movement of the indicator, and means for rendering said halting means operable in response to each transmitted impulse, the said time duration of each of said indicating cycles including said momentary halt.

24. In combination, a transmitter having a transmitting means, means for driving said means through repeated cycles of predetermined intervals, means whereby said transmitting means sends forth impulses in each cycle with the time interval between said impulses spaced in each cycle dependent on the then magnitude of the quantity of a variable quantity transmitted in said cycle, a receiver having an indicating device, means for moving said indicating device at a predetermined speed, and means for causing momentary indicating halts in the travel of the indicating device in response to the impulses received from the transmitter.

25. In combination, a transmitter having a transmitting means, means for driving said means through repeated cycles of predetermined periods of time, means responsive to the quantity of a variable quantity to be measured cooperable with said transmitting means to send forth impulses in each cycle with the time interval between said impulses spaced in each cycle dependent on the then magnitude of the condition transmitted in said cycle, a receiver having an indicating device, means for moving said indicating device during repeated cycles of the same time period as said transmitter and at a speed in predetermined relation to the speed of said transmitting means, and means for causing momentary indicating halts in the movement of the indicating device in each cycle in response to the impulses received from the transmitter, each of said indicating cycles including said halting periods.

26. In combination, a transmitter having a transmitting means, means for driving said means through repeated cycles of predetermined intervals, means responsive to a condition to be measured cooperable with said transmitting means to send forth impulses in each cycle with the time interval between said impulses spaced in each cycle dependent on the then magnitude of the condition transmitted in said cycle, a receiver having an indicating device, means for moving said indicating device at a predetermined speed during repeated cycles of the same time duration as said transmitting means, and means for causing momentary indicating halts in the movement of said indicating device in each cycle of the indicating device in response to and for the duration of said impulses, each of said indicating cycles including said halts.

27. In combination, a transmitting device including a transmitting member, means for operating said transmitting member through repeated cycles of predetermined intervals, means whereby said transmitting member sends forth impulses during each cycle, one at a fixed portion of each cycle, and one at a point in the time interval of each cycle spaced from said first impulse dependent on the then magnitude of the condition to be transmitted, a receiver including an indicating device, means for moving said indicating device during repeated cycles of the same time duration as said transmitting device cycles and at a speed in predetermined relation to the speed of said transmitting member, means for momentarily halting said indicating device in response to and for the duration of the first of said impulses, and also in response to and for the duration of the second of said impulses, each of said cycles including said halting periods.

28. In combination, a transmitting device including a transmitting member, means for operating said transmitting member through repeated cycles of predetermined intervals, means whereby said transmitting member sends forth impulses during each cycle, one at a fixed portion of each cycle, and one at a point in the time interval of each cycle spaced from said first impulse dependent on the then magnitude of the condition to be transmitted, a receiver including an indicating device, means for moving said indicating device at a predetermined speed during repeated cycles of the same time duration as said transmitting device cycles, means for momentarily halting said indicating device in response to the first of said impulses, and also in response to the second of said impulses, the said indicating cycles including said halting periods.

29. In combination, a transmitter including a transmitting member, means for operating said member through repeated cycles of predetermined intervals, means whereby said transmitting member sends forth an impulse at a fixed portion of each cycle, and a further impulse at a point in each cycle spaced from said fixed portion by a time interval dependent on the quantity of a variable quantity to be measured, a receiver including an indicating device, means for driving said indicating device at a predetermined speed and operating through fixed cycles, said means being so calibrated that if continuously operated they will drive the indicating device through each of its fixed cycles in a time interval shorter by a predetermined amount than the time interval of the cycles of said transmitting member, means for halting the drive of said indicating device in each cycle for predetermined intervals and operable in response to the two impulses of said transmitting device, the sum of said predetermined halting intervals equalling the said predetermined amount of difference in the intervals of the cycles, so that the cycles of operation of said indicating device will be of the same duration as the cycles of said transmitting member.

30. In combination, a transmitter including a transmitting member, means for operating said member through repeated cycles of predetermined intervals, means whereby said transmitting member sends forth an impulse at a fixed portion of each cycle, and a further impulse at a point in each cycle varying from said fixed portion by a time interval dependent on the quantity of a variable quantity to be measured, a receiver including an indicating device, means for driving said indicating device at a predetermined speed during fixed cycles, said means being so calibrated that if continuously operated they will drive the indicating device through each of its fixed cycles in a time interval shorter by a predetermined amount than the time interval of the cycles of said transmitting member, means for halting the drive of said indicating device in each cycle for predetermined intervals and operable in response to the two impulses of said transmitting device, the sum of said predetermined halting intervals equalling the said predetermined amount of difference, so that the time period cycles of said indicating device including said halts will be of the same duration as the cycles of said transmitting member, the time of movement of said indicating device between the end of the halting period induced by said first impulse, and the beginning of the halting period induced by said second impulse in each of its cycles being proportional to the then magnitude of the variable quantity transmitted by said transmitting member.

31. In combination, a transmitter including a transmitting member, means for operating said transmitting member through repeated cycles of predetermined intervals, means whereby said transmitting member sends forth an impulse at a fixed portion in each cycle and a further impulse at a point in the time interval of each cycle spaced from the first impulse in accordance with the quantity of a variable quantity to be measured, a receiver including an indicating device, means for repeatedly moving said indicating device through a fixed path cycle in the same time period as said transmitting cycles, means for halting said indicating device in each path cycle, said means being operable in response to the first of said impulses to halt the indicating device momentarily in a fixed portion of its path cycle after which it resumes its movement, said means being operable in response to the second of said impulses to halt the indicating device momentarily at a point in its path cycle spaced from the point of said first halt in accordance with the quantity transmitted, each of said indicating cycle time periods including said halting periods.

32. In combination, a transmitter including transmitting means, means for operating said means through fixed cycles of predetermined intervals, means including means responsive to the condition to be measured or transmitted cooperable with said transmitting means for sending forth impulses in each cycle, one at a fixed point in each cycle and one at a point in the time interval of each cycle spaced from said fixed point in proportion to the quantity of a variable quantity transmitted, a receiver including an indicating device, means for moving said indicating device during fixed cycles of the same time intervals as said transmitter cycles, means for halting said indicator in each cycle and operable in response to said impulses, said means being operable in response to said first impulse to halt said indicator at a checking point until it may begin a cycle at the same time as said transmitting means being its cycle, said means being operable in response to each second impulse to halt said indicator at a point in its cycle proportional to the then location of the transmitter in its cycle at the time it transmits the second impulse, said indicator being then movable back to its checking point where it is again halted by the next succeeding first impulse until the transmitting means begins the next cycle.

33. In combination, a transmitter including a transmitting member, means for operating said member through repeated cycles of predetermined intervals, a receiver including an indicating device, means for repeatedly moving said indicating device through a fixed path cycle, means for halting the movement of said indicating device while it is moving through its path cycle, means whereby said transmitter sends forth an impulse at a checking point denoting the end of the preceding cycle and the beginning of the next cycle, means whereby said indicator halting means are responsive to said impulse for halting said indicating device momentarily whereby at a predetermined interval after the sending of the impulse the indicator may resume its movement in timed relation to said transmitter, means whereby said transmitter sends forth an impulse at a point in the time interval of each cycle spaced from the beginning of its timed relation movement with the indicator proportional to the quantity of a variable quantity to be transmitted, said indicator halting means being responsive to said second impulse for halting said indicator momentarily at a point in its path cycle spaced from its first halting point in proportion to the then position of the transmitter in its cycle, said indicator being movable after said second momentary halt to the end of its path cycle for halting once again in response to the next successive first of said transmitter impulses before beginning a new cycle.

34. In combination, a transmitter including a transmitting member, means for operating said member through repeated cycles of predetermined intervals, a receiver including an indicating hand, means for repeatedly moving said indicating hand through a fixed path cycle, means for halting the movement of said indicating hand while it is moving through its path cycle, means whereby said transmitter sends forth an impulse at a checking point denoting the end of the preceding cycle and the beginning of the next cycle, means whereby said hand halting means are responsive to said impulse for halting said hand for the duration of said impulse whereby after the impulse, the hand and transmitter may move in timed relation in their respective cycles, means whereby said transmitter sends forth a second impulse at a point in the time interval of each cycle varying from said first impulse by a time interval proportional to the then quantity of a variable quantity to be transmitted, said hand halting means being responsive to said second impulse for halting said hand at a point in its path cycle spaced from its first halting point in proportion to the quantity transmitted, said hand being thereafter movable until halted once again by the next successive first impulse at the end of which it may begin a new path cycle, and a dial relatively to which said hand moves, the first indicator halting position being calibrated to take place at a checking point of said dial.

35. In combination, a transmitting device including a transmitting member, means for operating said transmitting member through repeated cycles of predetermined time intervals and through predetermined physical paths, means whereby said transmitting member sends forth impulses during each cycle, one at a fixed portion of its path, and one at a point in its path spaced from said fixed portion dependent on the then quantity of a variable quantity to be measured, a receiver including an indicating device, means for repeatedly moving said indicating device through the same physical path as said transmitting device in cycles of like periods of time, means for momentarily halting said indicating device in each cycle in response to the first of said impulses, and also in response to the second of said impulses, the speed of movement of said indicating device being such that it may complete each cycle of halts and movement in the same time interval as said transmitter cycles.

36. In combination, a transmitting device including a transmitting member, means for rotating said transmitting member through repeated cycles of predetermined time intervals and predetermined angular degrees, means whereby said transmitting member sends forth impulses during each cycle, one at fixed portion of its angular movement, and one at a point in its angular movement spaced from said fixed portion dependent on the then quantity of a variable quantity to be transmitted, a receiver including an indicating device, means for repeatedly rotating said indicating device through the same angular degrees as said transmitting device in cycles of like periods of time, means for momentarily halting said indicating device in each cycle in response to the first of said impulses, and also in response to the second of said impulses, the speed of movement of said indicating device being such that it may complete each cycle of halts and movement in the same time interval as said transmitter cycles.

FRANKLIN R. THOMPSON.